United States Patent
Earle et al.

(10) Patent No.: US 7,832,320 B2
(45) Date of Patent: Nov. 16, 2010

(54) SAW BLADE WITH REPLACEABLE CUTTING TEETH MEMBERS

(75) Inventors: Gregory J. Earle, St. Marys, PA (US);
David Szymanski, St. Marys, PA (US);
Gregory F. Magaro, Emporium, PA (US)

(73) Assignee: Indigo Innovators, Inc., St. Marys, PA (US)

( * ) Notice: Subject to any disclaimer, the term of this patent is extended or adjusted under 35 U.S.C. 154(b) by 0 days.

(21) Appl. No.: 11/432,047

(22) Filed: May 11, 2006

(65) Prior Publication Data
US 2007/0261530 A1    Nov. 15, 2007

(51) Int. Cl.
*B27B 33/12* (2006.01)

(52) U.S. Cl. .............. 83/839; 83/835; 83/841

(58) Field of Classification Search .......... 83/835, 83/839–845
See application file for complete search history.

(56) References Cited

U.S. PATENT DOCUMENTS

| | | | | | |
|---|---|---|---|---|---|
| 102,400 | A | * | 4/1870 | Hogan | 83/841 |
| 105,349 | A | * | 7/1870 | Maulick | 83/840 |
| 325,679 | A | * | 9/1885 | Ledward | 83/841 |
| 1,653,265 | A | * | 12/1927 | Foerster | 83/840 |
| 2,583,243 | A | | 1/1952 | Tweedie | |
| 2,725,083 | A | | 11/1955 | Ackley | |
| 2,852,048 | A | * | 9/1958 | Cox | 83/831 |
| 2,871,728 | A | * | 2/1959 | Tremblay | 76/31 |
| 2,873,775 | A | | 2/1959 | Abbott | |
| 3,023,490 | A | | 3/1962 | Dawson | |
| 3,036,567 | A | * | 5/1962 | Biesanz, Sr. | 125/15 |
| 3,144,059 | A | | 8/1964 | Oehrli | |
| 3,308,859 | A | | 3/1967 | Ehlen | |
| 3,528,465 | A | | 9/1970 | Omley | |
| 3,547,167 | A | | 12/1970 | Raetz | |
| 3,800,633 | A | | 4/1974 | Funakubo | |
| 4,114,494 | A | * | 9/1978 | Budke et al. | 83/835 |
| 4,546,755 | A | | 10/1985 | Gustavsson | |
| 4,628,976 | A | * | 12/1986 | Loring | 144/241 |
| 4,690,024 | A | | 9/1987 | Chaconas | |
| 4,744,148 | A | * | 5/1988 | Brown | 30/276 |
| 4,744,278 | A | | 5/1988 | Wright | |

(Continued)

FOREIGN PATENT DOCUMENTS

JP       07178615  A  *  7/1995

OTHER PUBLICATIONS

Hawk Precision Components—Copper Infiltration www.netshapetech.com/G/G06/G06_images/F_03085_Copper.pdf copyright year—2002.*

*Primary Examiner*—Jason Daniel Prone
*Assistant Examiner*—Jennifer Swinney
(74) *Attorney, Agent, or Firm*—Fay Sharpe LLP; Kimberly A. Textoris (57) ABSTRACT

A saw blade with replaceable cutter teeth is provided. The saw blade is generally planer and has a first side and a second side, a leading edge and an inner edge. Plural cutting teeth members are removably secured at alternating spaced apart locations on the first side and the second side of the saw blade. Cutting teeth members have a cutting blade which extends outwardly from the leading edge. A variety of different ways to secure the cutting teeth onto the first side and the second side of the saw blade are disclosed.

20 Claims, 6 Drawing Sheets

U.S. PATENT DOCUMENTS

| | | |
|---|---|---|
| 4,750,396 A | 6/1988 | Gaddis |
| 4,848,205 A * | 7/1989 | Suzuki et al. ............... 83/853 |
| 4,901,613 A | 2/1990 | Carlton |
| 5,048,389 A * | 9/1991 | Carlton ....................... 83/838 |
| 5,318,006 A | 6/1994 | Walen et al. |
| 5,524,518 A * | 6/1996 | Sundstrom ................... 83/845 |
| 6,058,825 A * | 5/2000 | Harfst ......................... 83/834 |
| 7,150,215 B2 * | 12/2006 | Krehel ......................... 83/839 |
| 2002/0112590 A1* | 8/2002 | Bohner et al. ................. 83/840 |
| 2005/0178263 A1* | 8/2005 | Szymanski ................... 83/831 |

* cited by examiner

SAW BLADE WITH REPLACEABLE CUTTING TEETH MEMBERS

FIELD OF THE INVENTION

The present invention relates to a saw blade with removable and replaceable cutting teeth members. More specifically, it relates to such a saw blade which ultimately mounts said cutting teeth on opposite sides of the saw blade.

BACKGROUND OF THE INVENTION

It is well known in the art to provide a saw blade, whether straight or circular, which includes removable and replaceable teeth.

For example, U.S. Pat. No. 174,216 to J. E. Emerson discloses a saw which has removable teeth which are held into place with a spring loaded mechanism.

U.S. Pat. No. 246,703 to E. C. Atkins discloses a detachable saw tooth which employs the use of detentes to hold insertable teeth in place.

U.S. Pat. No. 303,787 to W. Arnold discloses an insertable saw tooth which is generally curved in nature and provides a spring like securing method when the curved member is forced into a straight slot.

U.S. Pat. No. 1,608,182 to J. Pashpish discloses an insertable saw tooth for circular saw blades which also employs a pin 11 and notches 9 and 10. As can be seen by these patents, the provision of removable saw teeth members has been well known for well over 100 years.

Recently, U.S. Pat. No. 4,801,224 to Peterson et al. discloses a tool and insert for chip removal which teaches the provision of an insert which achieves a carefully definable stop in the longitudinal direction of the insert independent of the magnitude of the cutting forces acting upon the insert.

U.S. Pat. No. 5,524,518 to Sundstrom discloses a saw blade with replaceable tips wedged in recesses along the periphery of the blade and held thereby elastic forces. Sundstrom also teaches the provision of tension distributing holes in the saw blade.

While many attempts have been made to provide a replaceable cutting member for the saw blade, there remains to this day a need for a saw blade, whether it be a band saw blade or a circular blade, which allows for the quick and easy replacement of a cutting tooth without special tools while allowing a secure and safe attachment of the cutting tooth member to the blade.

SUMMARY OF INVENTION

The present invention provides a unique solution to the problem of reliably attaching the replaceable teeth members to a saw blade by attaching the teeth members to opposite sides of the saw blade rather than to insert the teeth in a slot in the outer or leading edge of the saw blade as is the case with the prior art. The present invention in its simplest form includes a saw blade with replaceable cutter teeth comprising a) a generally planar saw blade having a first side and a second side, a leading edge and an inner edge; b) a plurality of cutting teeth members removably secured at alternating spaced apart locations on said first side and said second side of said saw blade, said cutting teeth members having a cutting blade extending outwardly of said leading edge; and c) securing means to removably secure said cutting teeth members onto said first side of said saw blade and onto said second side of said saw blade.

Preferably, the saw blade has a securing means which further comprises: a) a plurality of spaced apart cutting teeth holders attached, alternatively, to said first side of said saw blade and to said second side of said saw blade, said spaced apart cutting teeth holders each having an outer portion at a forward end of the cutting teeth holder which extends outwardly of said leading edge and onto which cutter teeth members are removably attached, said cutting teeth holders also providing gullet spaces located between said outer portions, said outer portion having at least one edge cut at an angle whereby the cross sectional area of said outermost portion increase in size at locations more distance from said forward end; and b) plural cutting teeth members each having a slot adapted to receive said outer portion of said cutting teeth holder to removably hold and lock said cutting teeth members onto said saw blade by a friction fit.

In one embodiment of the invention, the cutting teeth holders can be welded or riveted to the first side of the saw blade and to the second side of the saw blade.

In another embodiment of the invention, the cutting teeth holders can be bolted or otherwise secured to the first side of the saw blade and to the second side of the saw blade.

Preferably, the saw blade of the present invention has a securing means which further comprises: a) said saw blade having a plurality of spaced apart cutting teeth holders formed therein with gullet spaces therebetween, said gullet spaces being positioned inwardly from said cutting teeth holders, alternating adjacent cutting teeth holders having a groove cut into said first side and said second side, respectively, said grooves being spaced apart and generally parallel with said leading edge and having a groove opening with extends into a gullet space and having an opposite closed groove end, said cutting teeth holders each having an outer portion which extends outwardly of said leading edge wherein at least one edge of said outer portion is cut at an angle whereby the cross sectional area of said outermost portion increases in size at locations closer to said closed groove end; and b) plural cutting teeth members each having a slot adapted to receive said outer portion of said cutting teeth holder to removably hold and lock said cutting teeth members into place on said saw blade by a friction fit.

Still further, the saw blade according to the present invention preferably includes a securing means which further comprises: a) said saw blade having a plurality of spaced apart cutting teeth holders formed therein with gullet spaces therebetween, said gullet spaces being positioned inwardly from said cutting teeth holders, alternating adjacent cutting teeth holders having a groove cut into said first side and said second side, respectively, said grooves adapted to receive a first side cutting tooth member and a second side cutting tooth member, respectively, said grooves being spaced apart and generally parallel with said leading edge and having a groove opening with extends into a gullet space and having an opposite closed groove end, said cutting teeth holders having an outermost portion having a generally "L" shaped configuration, wherein at least one edge of which is cut at an angle whereby the cross sectional area of said "L" shaped outermost portion increases in size at locations closer to said closed groove end; and b) a plurality of cutting teeth members each having an "L" shaped slot therein adapted to receive said outermost portion of said cutting teeth holder to removably hold said cutting tooth member on said saw blade, whereby sliding said slot of said teeth members over said outermost portions of said cutting teeth holders and pushing toward said closed groove end locks said teeth in place on said saw blade with a friction fit.

Preferably, the cutting teeth members which are removably attached from the first side of the saw blade have a mirror image configuration to the cutting teeth members which are removably attached to the second side of the saw blade.

Preferably, the saw blade has an outer portion which has a surface which is cut at an angle between 0.05 degrees to about 45 degrees relative to the groove at a close tolerance effective to cause self-locking engagement of the cutting teeth onto the cutting teeth holders.

Preferably, the close tolerance is characterized by a variation and said angle not being more than about 1 degree.

Preferably, the saw blade has a close tolerance which is characterized by variation in said angle being not more than 0.5 degrees.

Preferably, the cutting teeth members comprise sintered and compacted particles of abrasion resistant material.

Preferably, the abrasion resistant material comprises at least one of metal and ceramic.

Preferably, the cutting teeth members comprise a water-resistant material applied by a process selected from the group consisting of steam treatment, resin infiltration, copper infiltration and Loctite TM infiltration.

Preferably, the saw tooth blade is formed of steel.

Preferably, the cutting teeth members comprise sintered and compacted particles of abrasion resistant material.

In one embodiment of the invention, the saw blade is a circular saw blade.

In one embodiment of the invention, an inner portion of said saw blade is formed of steel and an outer ring of the saw blade is a powered metal ring bonded to said inner portion of said saw blade.

In another embodiment of the invention, the saw blade is a band saw blade.

Other embodiments of the invention are contemplated to provide particular features in structural variance of the basic elements. The specific embodiments referred to as well as possible variations and the various features and advantages of this invention will become better understood from the accompanying drawings in conjunction with the following detailed description.

Referring to FIGS. 1-9, a saw blade 10 is provided which has a first side 12 and a second side 14. The saw blade has a leading edge 16 and an inner edge 18.

Figure 1:
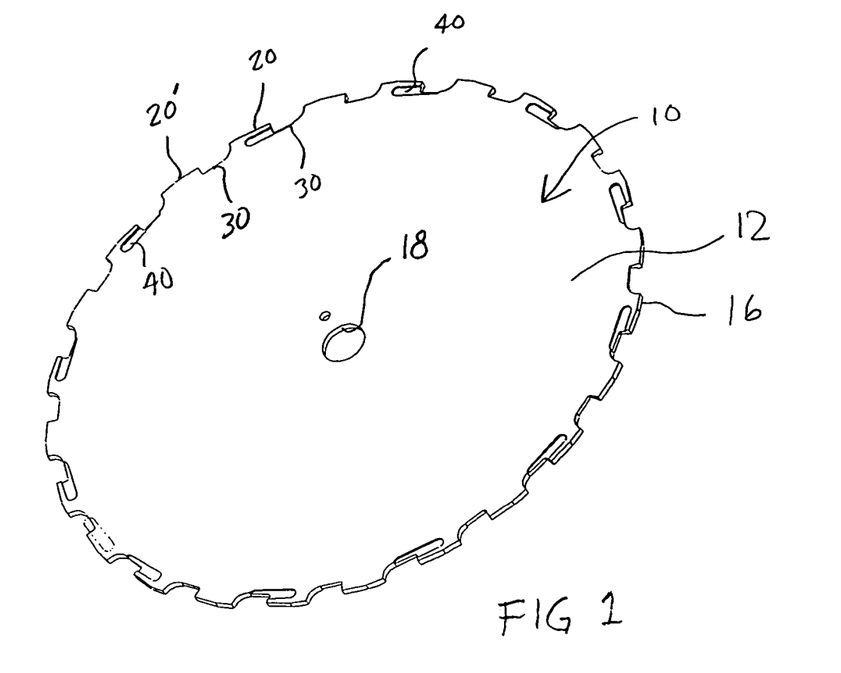
FIG. 1 is a perspective view of a first side of a circular saw blade according to the present invention.
Figure 2:
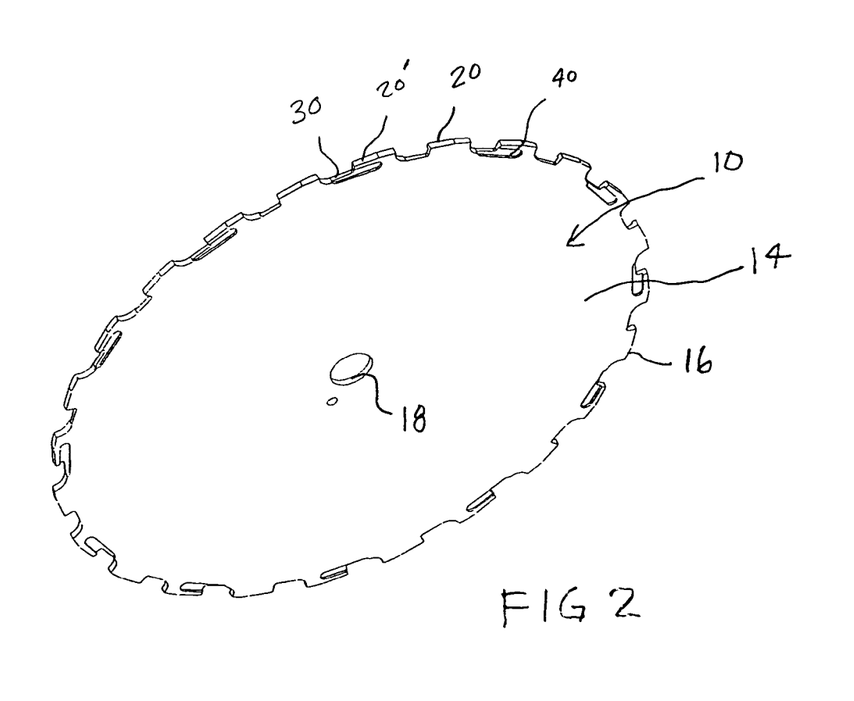
FIG. 2 is a perspective view of a second side of a circular saw blade according to the present invention.
Figure 3:
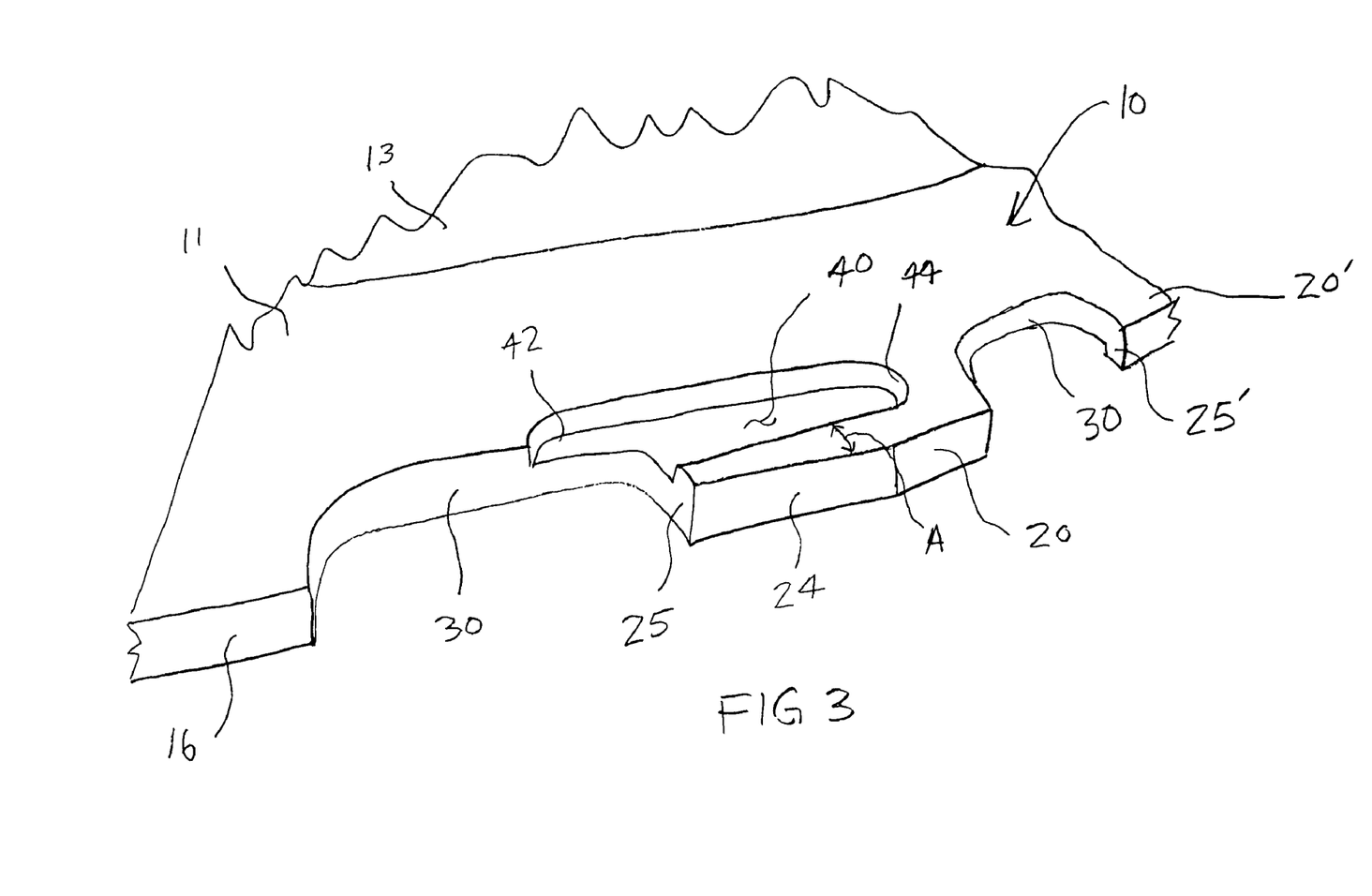
FIG. 3 is a perspective view of a section of the saw blade of FIG. 1.

As best shown in FIG. 3, a plurality of cutting tooth holders 20 are provided at spaced apart locations along the leading edge 16 of the blade. A plurality of gullet spaces 30 are provided between adjacent cutting holder members 20.

The cutting holder members 20 are formed to have a groove 40 provided on one side of the blade in a manner such that a generally "L" shaped cross-sectional configuration outer portion 25 is created. At least one edge 24 of the outer portion 25 is cut at an angle "A" with respect to the groove 40 whereby the cross-sectional area of the outer portion 25 increases in size at locations closer to the closed end 44 of groove 40. An open end 42 of groove 40 opens into the gullet space 30 as shown.

As can be seen, an L shaped cross-sectional configuration 25' is provided on a cutting holder member 20' which is adjacent to the cutting holder member labeled 20 on FIG. 3. This configuration can also be understood by viewing FIGS. 1 and 2 which show a first side 12 and a second side 14, respectively of the saw blade 10. Finally, FIG. 3 also shows that an inner portion 13 of blade 10 can be formed of steel while an outer portion 11 can be formed of a powdered metal ring bonded to the inner portion 13 of the saw blade 10.

Figure 4:
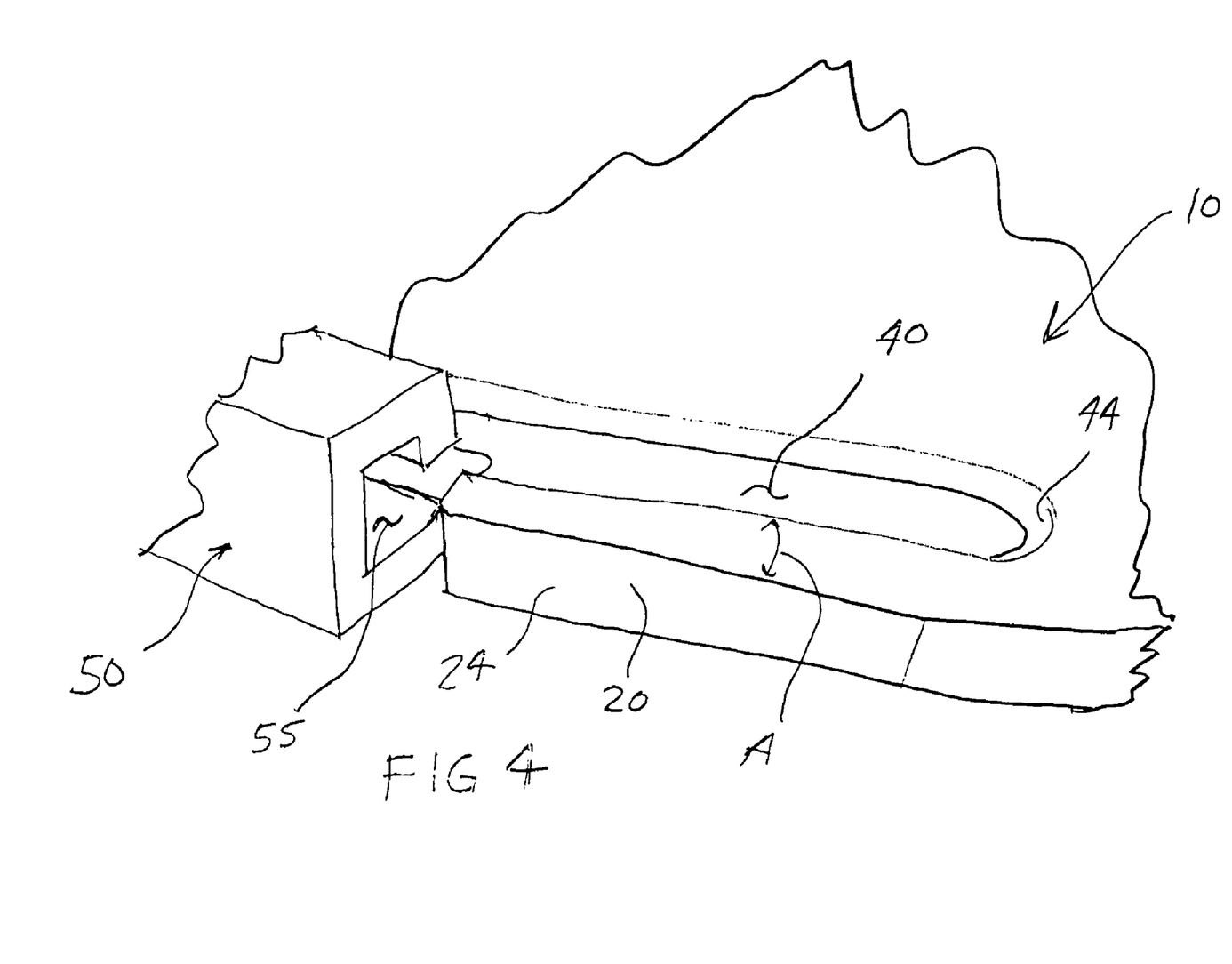
FIG. 4 is a perspective view showing a cutting tooth member aligned for attachment to the saw blade.

Referring to FIG. 4, it can be seen that a cutting member 50, which has a generally L shaped slot 55 therein, is shown in position to be inserted onto the cutting holder member 20 of saw blade 10. Because surface 24 is cut at an angle A which is preferably in the range of 0.5 degrees to 5 degrees, it will be obvious that as the cutting tooth member is pushed closer to the closed end 44 of the groove 40, that the cutting tooth member 50 will become securely locked onto the cutting holder member 20 by means of a friction fit.

Figure 5:
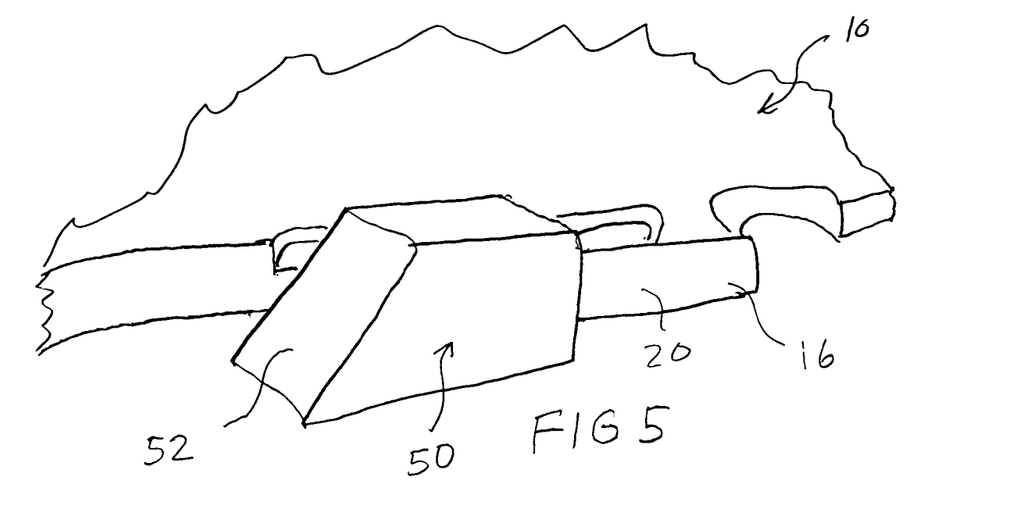
FIG. 5 is a perspective view showing a cutting tooth member as attached to the saw blade.

Referring now to FIG. 5, a cutting member 50 is shown as fully attached to a cutting holder member 20 of blade 10. As can be seen, the cutting member 50 has a cutting edge 52.

As will be obvious to those of skill in the art, because adjacent cutting holder members 20 are provided on opposite sides of the blade 10, it is necessary for the cutting teeth for the first side to have a slightly different configuration than the cutting teeth for a second side of the saw blade 10.

Figure 6:
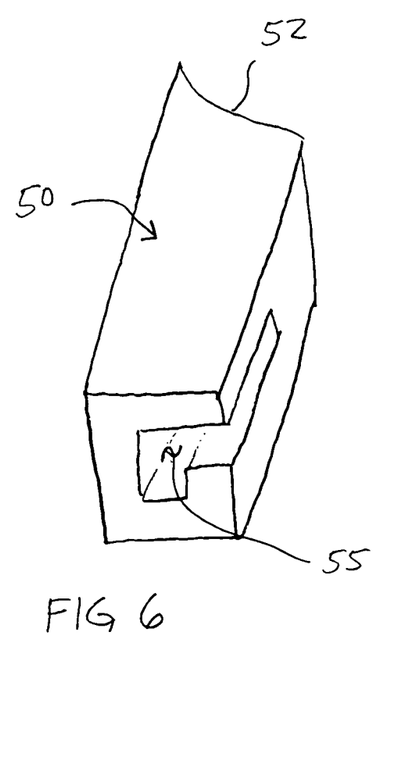
FIG. 6 is a perspective view of a cutting member adapted for use on one side of the saw blade.

FIG. 6 shows the configuration of a cutting tooth 50 which has a generally L shaped slot 55 therein for attachment to a first side 12 of the saw -blade 10. Cutting tooth member 50 has a blade portion 52 at a forward end thereof.

Figure 7:
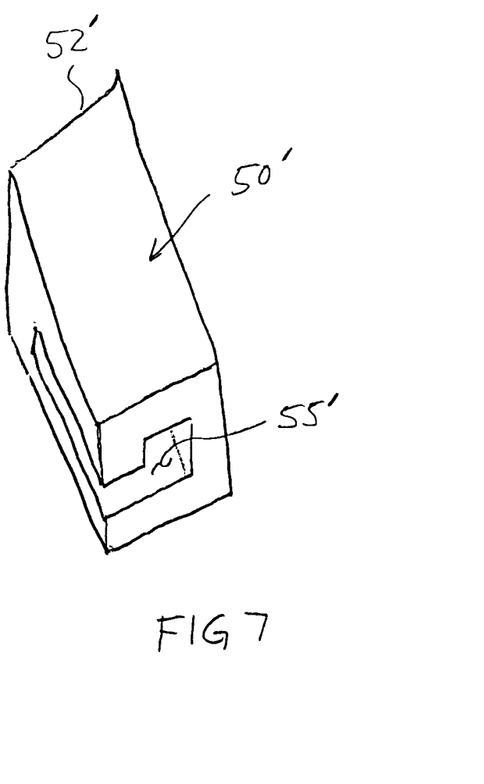
FIG. 7 is a perspective view of a mirror image cutting member adapted for use on the second side of the saw blade.

FIG. 7 refers to a cutting tooth member 50' which is adapted for attachment to a second side 14 of saw blade 10 by means of a slot 55' which is adapted to be received by a cutting holder member 20' of blade 10. Cutting tooth member 50' also has a blade member 52' at a forward end thereof.

Figure 8:
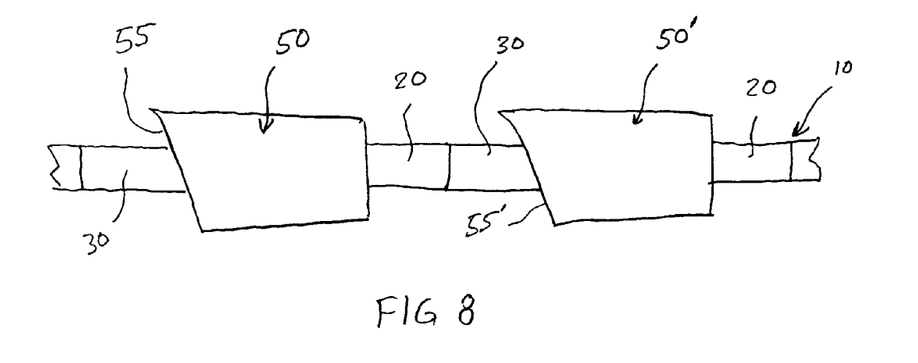
FIG. 8 shows a top plan view showing the leading edge of the saw blade with adjacent cutting members attached.
Figure 9:
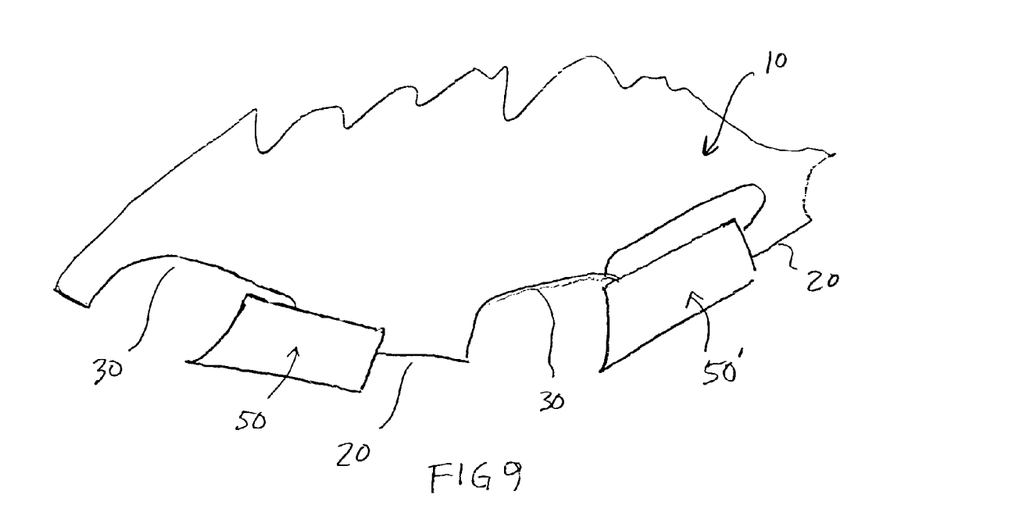
FIG. 9 is a side elevational view of the saw blade showing two cutting members attached.

As is shown in FIGS. 8 and 9, the orientation and configuration of the cutting tooth members 50 and 50' as attached to the saw blade 10 is shown.

Figures 10, 11:
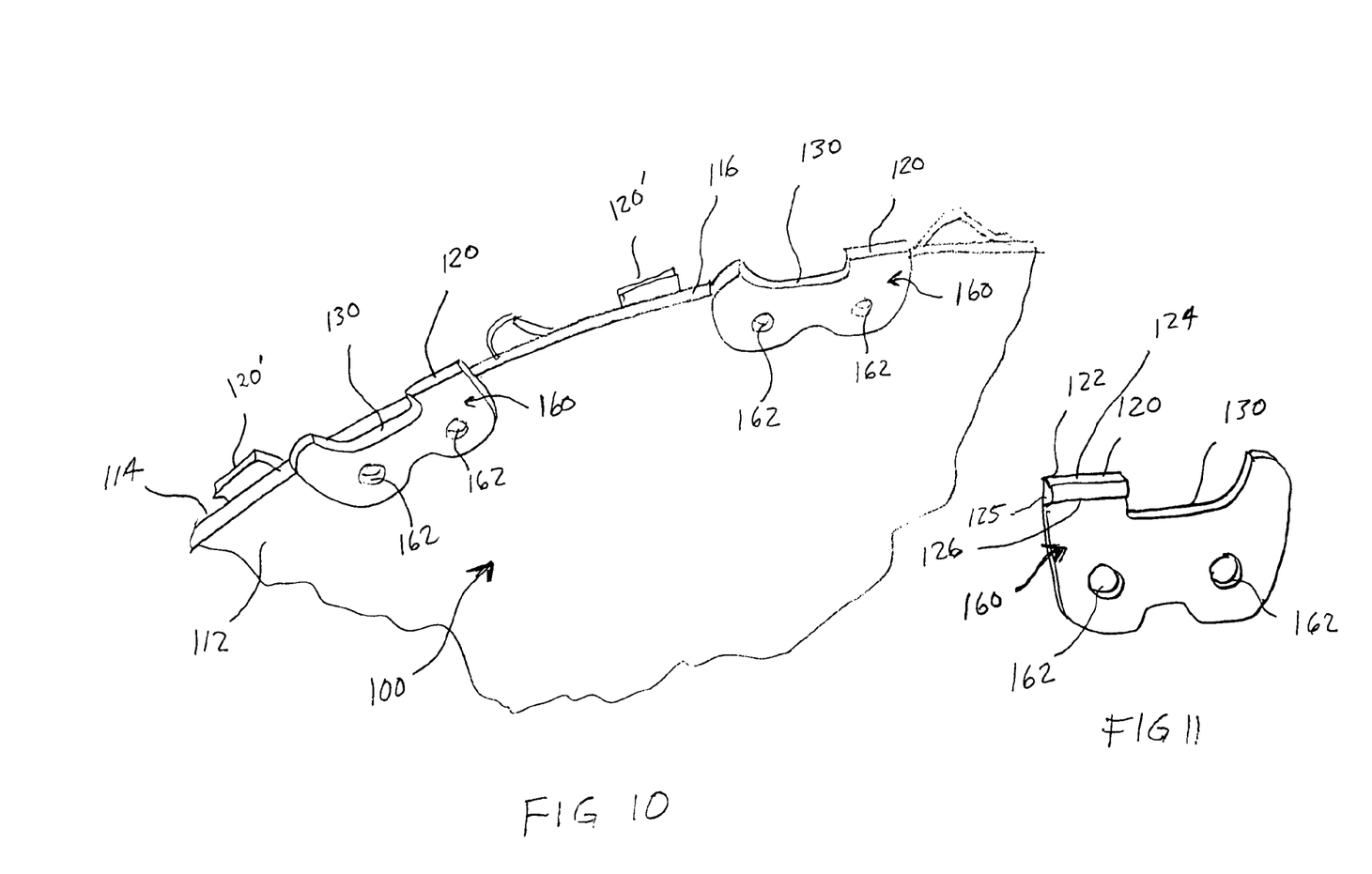
FIG. 10 is a perspective view of an alternative embodiment of the present invention with cutter teeth holders attached to opposite sides of the saw blade.
FIG. 11 is a perspective view of a cutter tooth holder for use with the embodiment shown in FIG. 10.

Referring finally to FIGS. 10 and 11, an alternative embodiment of the present invention is shown. In this embodiment, a blade member 100 has a first side 112 and a second side 114. In this embodiment, a leading edge 116 is completely circular and does not have gullet spaces or cutting teeth holders formed directly onto the blade. Rather, separate cutting holder members 160 are attached alternating to opposite sides of the blade in spaced apart manner as shown. Cutting holder portion 120 on the opposite side and spaced apart from cutting holder portion 120'. The cutting holders 160 may be riveted through bolt holes 162 to the blade member 100 or may be riveted directly to the blade 100. The cutting holder members 160 provide a gullet space 130 and a cutting holder portion 120 which, like the embodiment of the invention previously described, includes at least one surface 124 which is cut at an angle with respect to surface 126 of the forward end 122 of the cutting holder member 120. This forms a generally L shaped cross-sectional configuration as shown at 125 with the cross-sectional area becoming larger as one gets closer to the gullet space 130. It will be obvious to those skilled in the art that teeth members as shown in FIGS. 6 and 7 may then be secured by a friction fit onto cutting holder members 120 in a manner similar to that described with respect to FIGS. 1-9.

Although the invention has been described in its detailed form with a certain degree of particularity, it will be understood that the present disclosure of the detailed description and preferred embodiments have been made only by way of example and that various changes and modifications can be resorted to without departing from the true spirit and scope of the invention as hereafter claimed:

We claim:

1. A saw blade with replaceable cutting teeth members comprising:
   a) a generally planar saw blade having a first side and a second side, a leading edge and an inner edge;
   b) a plurality of cutting holder members, integrally formed with said blade, formed to have a groove provided on one side of said member, said groove traversing only a portion of a width of said member, such that said groove forms a generally 'L' shaped configuration on its outermost portion;
   c) a plurality of cutting teeth members removably secured at alternating spaced apart locations on said first side and said second side of said saw blade, said cutting teeth members having a cutting blade extending outwardly of said leading edge; and
   d) securing means to removably secure said cutting teeth members directly onto said first side of said saw blade and onto said second side of said saw blade;
   wherein said securing means further comprises:
   generally "L" shaped slots on said plurality of cutting teeth members adapted to receive said cutting holder member to removably hold and lock said cutting teeth members onto said saw blade by a friction fit.

2. A saw blade with replaceable cutting teeth members comprising:
   a) a generally planar saw blade having a first side and a second side, a leading edge and an inner edge;
   b) a plurality of cutting teeth members removably secured at alternating spaced apart locations on said first side and said second side of said saw blade, said cutting teeth members having a cutting blade extending outwardly of said leading edge; and
   c) securing means to removably secure said cutting teeth members onto said first side of said saw blade and onto said second side of said saw blade,
   wherein said securing means further comprises:
   i) said saw blade having a plurality of spaced apart cutting teeth holders formed therein with gullet spaces defining the entire space therebetween, said gullet spaces being positioned inwardly from said cutting teeth holders, alternating adjacent cutting teeth holders having a groove that does not traverse the entire width of the holder cut into one of said first side and said second side, respectively, said grooves being spaced apart and generally parallel with said leading edge and having a groove opening which extends into a gullet space and having an opposite closed groove end, said cutting teeth holders each having an outer portion which extends outwardly of said leading edge wherein at least one edge of said outer portion is cut at an angle whereby the cross sectional area of said outermost portion increases in size at locations closer to said closed groove end; and
   ii) a plurality of cutting teeth members each having a slot adapted to receive and directly secure to said outer portion of said cutting teeth holder to removably hold and lock said cutting teeth members into place on said saw blade by a friction fit.

3. A saw blade according to claim 2, wherein said securing means further comprises
   a) said saw blade having a plurality of spaced apart cutting teeth holders formed therein with gullet spaces therebetween, said gullet spaces being positioned inwardly from said cutting teeth holders, alternating adjacent cutting teeth holders having a groove cut into said first side and said second side, respectively, said grooves adapted to receive a first side cutting tooth member and a second side cutting tooth member, respectively, said grooves being spaced apart and generally parallel with said leading edge and having a groove opening which extends into a gullet space and having an opposite closed groove end, said cutting teeth holders having an outermost portion having a generally "L" shaped configuration, wherein at least one edge of which is cut at an angle whereby the cross sectional area of said "L" shaped outermost portion increases in size at locations closer to said closed groove end; and
   b) a plurality of cutting teeth members each having an "L" shaped slot therein adapted to receive said outermost portion of said cutting teeth holder to removably hold said cutting tooth member on said saw blade, whereby sliding said slot of said teeth members over said outermost portions of said cutting teeth holders and pushing toward said closed groove end locks said teeth in place on said saw blade with a friction fit.

4. A saw blade according to claim 3 wherein cutting teeth members which are removably attached on said first side of said saw blade have a mirror image configuration to cutting teeth members removably attached to said second side of said saw blade.

5. A saw blade according to claim 3 wherein said angle is between 0.5° to about 45° relative to said groove at a close tolerance effective to cause self-locking engagement of said cutting teeth onto said cutting teeth holders.

6. A saw blade according to claim 5 wherein said close tolerance is characterized by variation in said angle being not more than about 1°.

7. A saw blade according to claim 5 wherein said close tolerance is characterized by variation in said angle being not more than 0.5°.

8. A saw blade according to claim 1 wherein said cutting teeth members comprise sintered and compacted particles of abrasion resistant material.

9. A saw blade according to claim 8, wherein said abrasion resistant material comprises at least one of metal and ceramic.

10. A saw blade according to claim 1 wherein said cutting teeth members comprise a water resistant material applied by a process selected from the group consisting of stream treatment, resin infiltration, and copper infiltration.

11. A saw blade according to claim 1 wherein said saw blade is formed of steel.

12. A saw blade according to claim 2 wherein said cutting teeth holders comprise sintered and compacted particles of abrasion resistant material.

13. A saw blade according to claim 1 wherein said saw blade is a circular saw blade.

14. A saw blade according to claim 13 wherein an inner portion of said saw blade is formed of steel and an outer ring of said saw blade is a powdered metal ring bonded to said inner portion of said saw blade.

15. A saw blade according to claim 1 wherein said saw blade is a band.

16. A saw blade according to claim 2 wherein said cutting teeth members comprise sintered and compacted particles of abrasion resistant material.

17. A saw blade according to claim 16, wherein said abrasion resistant material comprises at least one of metal and ceramic.

18. A saw blade according to claim 2 wherein said cutting teeth members comprise a water resistant material applied by a process selected from the group consisting of stream treatment, resin infiltration, and copper infiltration.

19. A saw blade according to claim 2 wherein said saw blade is a circular saw blade.

20. A saw blade according to claim 19 wherein an inner portion of said saw blade is formed of steel and an outer ring of said saw blade is a powdered metal ring bonded to said inner portion of said saw blade.

* * * * *